Patented Jan. 9, 1951

2,537,666

UNITED STATES PATENT OFFICE 2,537,666

PRODUCING THICK SHEETS FROM THIN FILMS

James S. Gowing, Midland, Mich., assignor to The Dow Chemical Company, Midland, Mich., a corporation of Delaware No Drawing. Application August 10, 1945, Serial No. 610,191

3 Claims. (Cl. 154—139)

This invention relates to a method for the production of an apparently unitary body of relatively great thickness from thin films of oriented crystalline thermo-plastic polymers. It relates in particular to a method for the production of thick films from relatively thinner sheets of stretched and oriented crystalline vinylidene chloride polymers.

It has become well recognized in the art that many of the copolymers of vinylidene chloride, and particularly those in which vinylidene chloride predominates, exhibit evidence of crystallinity when examined by X-ray diffraction methods. It is known that these polymers can be extruded at a temperature above the fusion point, chilled to produce a temporarily non-crystalline material which is said to be in the supercooled condition and that the supercooled extrusion can be stretched to provide an article having high tensile strength in the direction of stretching, and which is characterized by a highly oriented crystallinity. These principles are set forth by Wiley in U. S. Patent No. 2,233,442 and by the same inventor and others in more recent patents. The principle has been applied to the formation of films from such normally crystalline vinylidene polymers. These films are ordinarily produced by the extrusion of a tube of the normally crystalline polymer, which tube is chilled to the supercooled condition and is then distended by internally applied fluid pressure to provide orientation of the crystallites parallel to the surface of the tube. By suitable control of the amount of longitudinal and radial stretching it is possible to obtain thin tubes which may be slit to provide thin films exhibiting nearly any desired ratio of longitudinal strength to transverse strength.

The above-described method of producing films of normally crystalline vinylidene chloride polymers has been limited in its practical application to the production of films which generally do not exceed 0.002 inch in thickness. It has been found to be too difficult to control the extrusion and stretching of these crystalline polymers when attempts have been made to produce directly uniform films in thicknesses up to 0.1 inch. There are many uses to which a film could be put if it could be provided in a thickness of 0.0025 inch or greater while still exhibiting all of the desirable strength characteristics of the crystalline films which are stretched both longitudinally and transversely during the course of their preparation.

It is accordingly an object of the present invention to provide a method for the production of films from normally crystalline polymers, which films have a thickness in the range from 0.0025 to 0.1 inch or greater and which exhibit the advantageous strength characteristics in both the longitudinal and transverse directions which have heretofore been found primarily in stretched crystalline films about 0.002 inch or less in thickness. A related object is the provision of a unitary coherent assembly of oriented crystalline vinylidene chloride films of at least 0.0025 inch thickness from previously formed thin films of the same material. A particular object is to provide such films without the use of adhesives. Other and related objects may appear hereinafter.

It has now been found that the foregoing and related objects may be attained and that coherent and apparently unitary films may be produced from relatively thin oriented crystalline vinylidene chloride copolymer films by stacking two or more such thin films, expressing air from between the layers of the assembly, securing the edges of the assembled films to prevent shrinkage of the assembly and heating the stack of films to a temperature between 45 and 20 centigrade degrees below the fusion temperature of their composition, thereafter cooling the assembly while still confining it against shrinkage and finally releasing the tension thereon. This method produces an article having all of the appearances of a single sheet of crystalline film material and having the strength characteristics which have heretofore been typical of the much thinner fully stretched films from which the new article is produced. The several layers going to make up the final product are so coherent that their individual existence is not detected by visual examination. It is extremely difficult, if not impossible, to effect a separation of the various layers by any mechanical means. It can be shown, however, that the assembly is not a fused and welded body by immersing it in acetone or certain other liquid non-solvents for the polymer having a low surface tension, whereupon lamination occurs into the respective individual thin sheets from which the apparently unitary body was originally produced.

The same mode of operation has been employed in attempts to produce similar coherent bodies from thin films of non-crystalline thermoplastic materials such as films of the thermoplastic cellulose ethers and esters or of the vinyl polymers such, for example, as the commercially available copolymer of vinyl chloride and vinyl acetate. Such attempts have been unsuccessful. The invention is effective only with crystalline polymers, and not with the non-crystalline polymers. It may be assumed that the moderate heat treatment to which the stacked crystalline films are subjected in making the new coherent assembly creates a tendency for each of the stacked films to shrink and to assume its greater thickness and smaller longitudinal and transverse dimensions which it would have had if it were not stretched in the course of its preparation. Since the stacked assembly is restrained against such shrinkage, it is assumed that the several films in the stack press firmly against one another in their attempts to shrink, helping them to cohere and to produce the apparently unitary thick film.

A copolymer of about 85 per cent vinylidene chloride and 15 per cent of vinyl chloride was plasticized with 7 per cent of its weight of di-(alpha-phenylethyl) ether. This composition had a softening point of about 160° C. and a fusion temperature of 171° to 173° C. It was extruded in the form of a tube which was passed through a water bath at about 3° C. to convert the material to the temporarily non-crystalline supercooled condition. The tube was then distended to four times its initial diameter while being stretched to about three and one-half times its original length per unit mass. The resulting thin crystalline film had a thickness of about 0.0013 inch. Other films were produced in a similar manner from the same composition in thicknesses in the range from 0.001 to 0.0017 inch. Various samples of these films were cut to provide squares 6 inches on each side. Assemblies of two, four, and six layers of such films were clamped in embroidery hoops to prevent shrinkage. The assemblies were warmed to about 90° C. and pressed to expel any air confined between the various layers. They were then heated for the length of time and at the temperature indicated in the following table after which they were cooled to room temperature, before the assembly was released from the hoops. Since the individual thin films had been produced by a blowing operation in which greater stretch occurred in one direction than the other, they had initially exhibited a correspondingly greater strength in that direction than in the other. Some of the assemblies described in the following table were made with the successive layers parallel as to their direction of maximum stretching while other of the assemblies were made with the successive layers crossed at right angles to their direction of maximum strength. The coherent and apparently unitary thick film made in accordance with the present invention was tested for tensile strength in each of two directions at right angles to one another. For convenience, one of these values is referred to in the following table as the longitudinal tensile strength while the other is called the transverse tensile strength.

Table

| No. of thin films | Heat Treatment | | Thickness of final films, inch | Tensile strength, pounds per square inch | |
|---|---|---|---|---|---|
| | Time, Seconds | Temp., °C. | | Longitudinal | Transverse |
| PART I.—LAYERS STACKED WITH THEIR AXES OF MAXIMUM STRENGTH IN ALIGNMENT | | | | | |
| 2 | 10 | 125 | .0025 | 12,000 | 13,200 |
| 2 | 60 | 125 | .0030 | 14,000 | 13,000 |
| 2 | 10 | 130 | .0029 | 12,000 | 14,000 |
| 2 | 60 | 130 | .0039 | 9,300 | 14,800 |
| 2 | 10 | 135 | .0033 | 8,700 | 13,700 |
| 2 | 60 | 135 | .0032 | 9,400 | 12,800 |
| 2 | 30 | 145 | .0026 | 9,000 | 8,300 |
| 4 | 30 | 140 | .0047 | 11,800 | 11,000 |
| 4 | 30 | 140 | .0065 | 10,000 | 13,000 |
| 4 | 30 | 149 | .0055 | 10,000 | 10,500 |
| 6 | 30 | 140 | .0091 | 9,800 | 10,500 |
| PART II.—LAYERS STACKED WITH AXES OF MAXIMUM STRENGTH AT 90° TO ADJACENT FILM | | | | | |
| 2 | 15 | 135 | .0025 | 11,000 | 13,000 |
| 4 | 15 | 135 | .0057 | 12,000 | 11,000 |
| 2 | 30 | 135 | .0027 | 10,000 | 11,000 |
| 4 | 30 | 135 | .0055 | 11,000 | 13,000 |
| FOR COMPARISON, UNTREATED FILMS | | | | | |
| 1 | ------ | ------ | .0013 | 7,800 | 8,900 |
| 2 | ------ | ------ | .0027 | 8,600 | 11,700 |

It is observed in the foregoing table that the apparently unitary, coherent assemblies are in each case at least as strong as the single thin films from which they are produced, on the basis of cross-sectional area. When dealing with films of the thicknesses here concerned, up to about 0.1 inch, it is generally more practical to handle a single sheet of the desired thickness than a plurality of separate foils having merely the desired aggregate thickness. The invention, then, provides a means for obtaining an assembly which, to all intents and purposes, is a single sheet having any desired thickness up to 0.1 inch, and which exhibits as well all of the advantageous properties of a stretched and oriented film of crystalline vinylidene chloride copolymer.

In contrast with the results here obtained, it has been found that the direct preparation of a thick sheet of crystalline polymer, either by molding an appropriate amount of the powdered or granular raw material, or by fusing together a plurality of thin sheets at a temperature above the melting point, results in the formation of relatively weak articles of limited flexibility and having tensile strengths generally in the range from 3500 to 5000 pounds per square inch. Such articles, even though crystalline, are not oriented and have limited utility where strong flexible films are desired.

The foregoing examples have shown the preparation of coherent film assemblies of small size, prepared under restraint in embroidery hoops. This is a convenient method of preparing samples quickly for laboratory tests, but the invention may be applied as well to the preparation of thick sheets of commercial dimensions, both in a batchwise and in a continuous manner. Any suitable clamping or restraining means may be used which will prevent shrinkage of the film during the herein-described heat treatment. When operating continuously, two or more thin films may be fed concurrently in face-to-face relation through a set of heated rollers at a rate to effect the required establishment of cohesive forces. If desired, there may be used any of the known means of preventing shrinkage transversely of the strips of film. Suitable means are available in the film stretching art and in the fabric tentering art.

The invention has been illustrated with respect to a particular copolymer of vinylidene chloride and vinyl chloride. It is applicable as well to any of the other normally crystalline vinylidene chloride copolymers. Broadly speaking, the temperature of the heat treatment varies from 45 to 20 centigrade degrees below the fusion temperature of the particular crystalline copolymer being treated. In the specific example the preferred operating temperatures were from 125° to 150° C. while the fusion temperature of the copolymer employed was about 171° to 173° C. Within the operative temperature range it has been found that an assembly of two layers of thin film may be caused to cohere near the lower end of the range and that slightly higher temperatures approaching the upper end of the range may be required or desirable when treating assemblies having greater numbers of component films.

It is shown in the examples that an exposure of from 10 to 60 seconds at heat treating temperatures is usually sufficient to effect the required coherence between the confined stacked films. Since no great difference in results is observed when heating is prolonged at the preferred temperature, it is concluded that the duration of the heat treatment need only be sufficient to insure that all parts of the assembly have been heated to the selected temperature.

While the process is carried out most conveniently at atmospheric pressure, it is apparent that the application of lower pressures may be effective to remove air from between the various folia in the assembly prior to the heat treatment, and that the application of higher pressures is possible, though unnecessary, during the heat treatment.

I claim:

1. The method which consists in stacking at least two thin films of stretched and oriented crystalline vinylidene chloride copolymer, the aggregate thickness of which is from 0.0025 to about 0.1 inch, removing air from between the films, securing all edges of the assembly against shrinkage, heating the assembly substantially at atmospheric pressure at a temperature from 20 to 45 centigrade degrees below the fusion temperature until it is heated throughout, and cooling the assembly to room temperature, thereby to produce an apparently unitary, coherent sheet of thickness substantially equal to the sum of the thicknesses of the initial thin films.

2. The method which consists in stacking at least two thin films of stretched and oriented crystalline copolymer of vinylidene chloride and vinyl chloride, the aggregate thickness of which is from 0.0025 to about 0.1 inch, removing air from between the films, securing all edges of the assembly substantially at atmospheric pressure against shrinkage, heating the assembly at a temperature from 20 to 45 centigrade degrees below the fusion temperature until it is heated throughout, and cooling the assembly to room temperature, thereby to produce an apparently unitary, coherent sheet of thickness substantially equal to the sum of the thicknesses of the initial thin films.

3. The method which consists in stacking at least two thin films of stretched and oriented copolymer of about 85 per cent vinylidene chloride and about 15 per cent vinyl chloride, the aggregate thickness of which is from 0.0025 to 0.1 inch, removing air from between the films, securing all edges of the assembly against shrinkage, heating the assembly substantially at atmospheric pressure for from 10 seconds to about 1 minute at a temperature between 125° and 150° C., and cooling the assembly to room temperature, thereby to produce an apparently unitary, coherent sheet of thickness substantially equal to the sum of the thicknesses of the initial thin films.

JAMES S. GOWING.

REFERENCES CITED

The following references are of record in the file of this patent:

UNITED STATES PATENTS

| Number | Name | Date |
|---|---|---|
| 2,233,442 | Wiley | Mar. 2, 1941 |
| 2,235,782 | Wiley | Mar. 18, 1941 |
| 2,307,846 | Miles | Jan. 12, 1943 |
| 2,392,695 | Rohdin | Jan. 8, 1946 |
| 2,441,940 | Rohdin | May 18, 1948 |

OTHER REFERENCES

Alien Prop. Cust., 367,723, May 11, 1943.